United States Patent
Nagy

(10) Patent No.: US 6,295,561 B1
(45) Date of Patent: Sep. 25, 2001

(54) SYSTEM FOR TRANSLATING NATIVE DATA STRUCTURES AND SPECIFIC MESSAGE STRUCTURES BY USING TEMPLATE REPRESENTED DATA STRUCTURES ON COMMUNICATION MEDIA AND HOST MACHINES

(75) Inventor: Michael E. Nagy, Tampa, FL (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/108,004

(22) Filed: Jun. 30, 1998

(51) Int. Cl.[7] .............................. G06F 15/16; G06F 9/45
(52) U.S. Cl. ................................ 709/246; 717/7
(58) Field of Search ................................ 709/236, 246, 709/234, 310, 247; 711/205, 207; 717/7; 370/476, 470, 472; 341/60, 106

(56) References Cited

U.S. PATENT DOCUMENTS

| | | | |
|---|---|---|---|
| 5,339,434 | 8/1994 | Rusis ................................ 395/700 |
| 5,708,828 | 1/1998 | Coleman ........................... 395/785 |
| 5,819,117 | * 10/1998 | Hansen ............................. 712/300 |
| 5,828,853 | * 10/1998 | Regal ................................ 710/128 |
| 5,909,552 | * 6/1999 | Jensen et al. ..................... 709/234 |
| 5,909,570 | * 6/1999 | Webber ............................ 703/13 |
| 5,924,126 | * 7/1999 | Rosenthal et al. ................ 711/207 |
| 5,968,164 | * 10/1999 | Loen et al. ....................... 712/204 |
| 6,016,555 | * 1/2000 | Deao et al. ....................... 714/35 |
| 6,021,275 | * 2/2000 | Horwat ............................ 717/7 |
| 6,055,619 | * 4/2000 | North et al. ..................... 712/36 |
| 6,091,733 | * 7/2000 | Takagi et al. .................... 370/401 |
| 6,141,792 | * 10/2000 | Acker et al. ..................... 717/5 |
| 6,151,608 | * 11/2000 | Abrams ........................... 707/204 |

* cited by examiner

*Primary Examiner*—Le Hien Luu
*Assistant Examiner*—Bunjob Jaroenchonwanit

(57) ABSTRACT

A system and method implemented, for example, by a C language compiler at either a source or target system, for translating between native data structures on arbitrary machines and specific message structures on communication media such that the byte order and word alignment on the native machine is translated as needed into the byte order and word alignment required in the communication media. In so doing, templates which represent data structures on the communication media and data structures in the host machine that represent the communication structures are defined. Then, translations adjusting for byte alignment (structure packing) and adjusting for byte order between these two representations are performed in either direction.

2 Claims, 4 Drawing Sheets

SYSTEM FOR TRANSLATING NATIVE DATA STRUCTURES AND SPECIFIC MESSAGE STRUCTURES BY USING TEMPLATE REPRESENTED DATA STRUCTURES ON COMMUNICATION MEDIA AND HOST MACHINES

BACKGROUND OF THE INVENTION

1. Technical Field of the Invention

This invention pertains to communications across networks between computers of different architectures. In particular, this invention provides templates enabling cross platform communication of complex structure-based messages across networks.

2. Background Art

Heretofore, dissimilar systems must communicate over networks using mutually agreed-upon message formats which do not take any system-specific characteristics such as word size or byte order into account. Two aspects of the problem which cause difficulty in such network communications are (1) structure packing, and (2) byte ordering.

Structure packing is a problem because not all compilers support #pragma pack(1). #pragma is an instruction to a compiler which the compiler may ignore, it is merely a suggestion. The "pack(1)" argument suggests to the compiler that it compress all data structures so no empty space exists, and the "(1)" refers one byte boundaries. A 32 bit computer generally aligns data on four byte boundaries. However, the "pack(1)" instruction will, if accepted by the computer, cause, for example, a 32 bit computer to behave like an 8 bit (that is, 1 byte) computer. No Macintosh compiler supports this option, for instance, and many UNIX and AIX compilers also lack this feature. The lack of such an option means that a programmer can not easily control the sizes of multi-part message structures due to differences in the native word size and word alignment rules on particular CPU architectures.

Byte ordering is a problem because different CPU architectures store multi-byte values in different physical memory orders. For instance, Intel-family CPUs store integers in the opposite byte order from PowerPC CPUs. This means that messages containing multi-byte components are difficult to handle in a portable fashion. C code source can be portable, but it is not automatically assured to be portable between computer platforms. C code source can be considered portable only if features that break portability are not used. For example, portability is broken by use of different integer lengths, such as 16 vs 32. The C language allows portability, but portability is easy to break. (In contrast, the ADA language guarantees portability.)

In the past, programmers dealt with problem (1) structure packing by declaring all structures used in inter-machine communication as simple arrays of bytes, then programming intricate and ugly 'byte-stuffing' logic to pack and unpack the arrays for communication. They dealt with problem (2) byte ordering by using macros or functions which pushed the CPU-architecture-dependent logic into header files or libraries which were still system-dependent (non-portable). While these techniques worked, they resulted in source code which was cryptic and very difficult to maintain.

Consequently, there is a need in the art for a system and method which enables the writing of portable communications software in, for example, C or C++ which will work property in a wide variety of target environments with only a mechanical recompile of the common source code.

It is an object of the invention to provide an improved system and method for structure packing and byte ordering.

It is a further object of the invention to provide an improved system and method for writing portable communications software that will work properly in a wide variety of target environments.

It is a further object of the invention to provide an improved system and method for translating between native data structures on arbitrary machines and specific message structures on communication media.

It is a further object of the invention to provide an improved system and method for translating data structures such that the byte order and word alignment on a native machine is translated as needed into the byte order and word alignment required in a communication media.

SUMMARY OF THE INVENTION

In accordance with the invention, a system and method is provided for translating between native data structures on arbitrary machines and specific message structures on communication media such that the byte order and word alignment on the native machine is translated as needed into the byte order and word alignment required in the communication media. In so doing, templates which represent data structures on the communication media and data structures in the host machine that represent the communication structures are defined. Then, translations adjusting for byte alignment (structure packing) and adjusting for byte order between these two representations are performed in either direction.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the preferred embodiment of the invention, messages are communicated across dissimilar software platforms using compiler 'templates' which automatically adjust to the machine byte order, word size, and word alignment to achieve platform independence.

As previously noted, the problems heretofore preventing such platform independence include (1) structure packing, and (2) byte ordering. In accordance with the invention, both of these problems are addressed by defining a technique for using 'templates' which automatically adjust to the machine byte order, word size, and word alignment with no change in source code required, yet allow correct run-time behavior when a simple set of portable helper routines is used. In one example embodiment, cross-platform communications functions on Macintosh, OS/2 and Windows 95/NT systems are provided. By using the method of the invention, straightforward message-based communications programs may be written which can exchange complex structure-based messages across networks.

Figure 1:
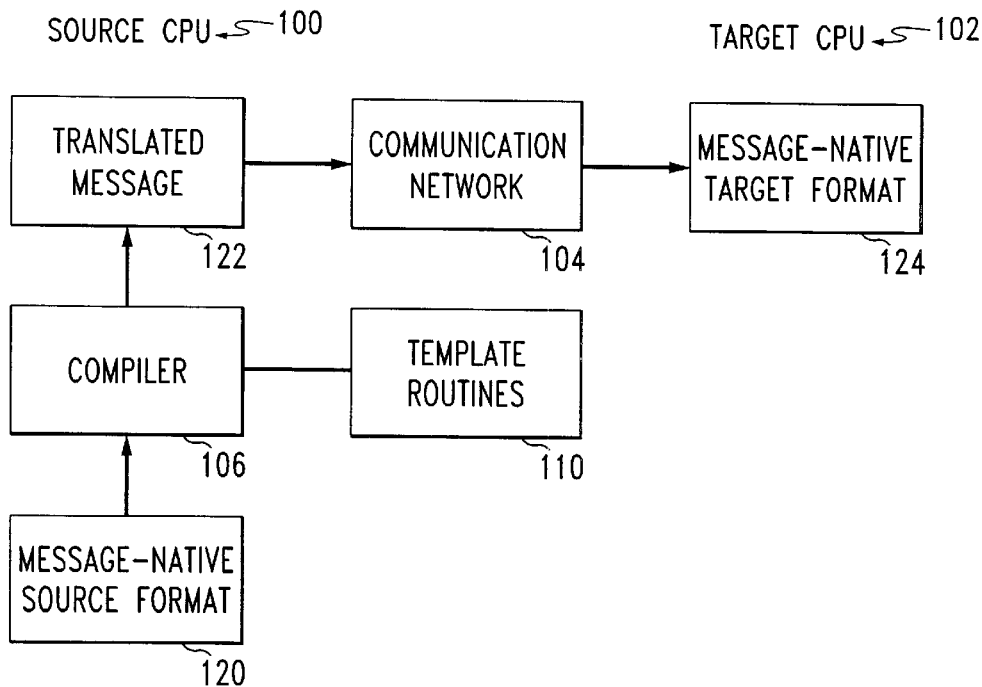
FIG. 1 is a high level system diagram illustrating the system of the invention, with message translation at the source CPU.
Figure 2:
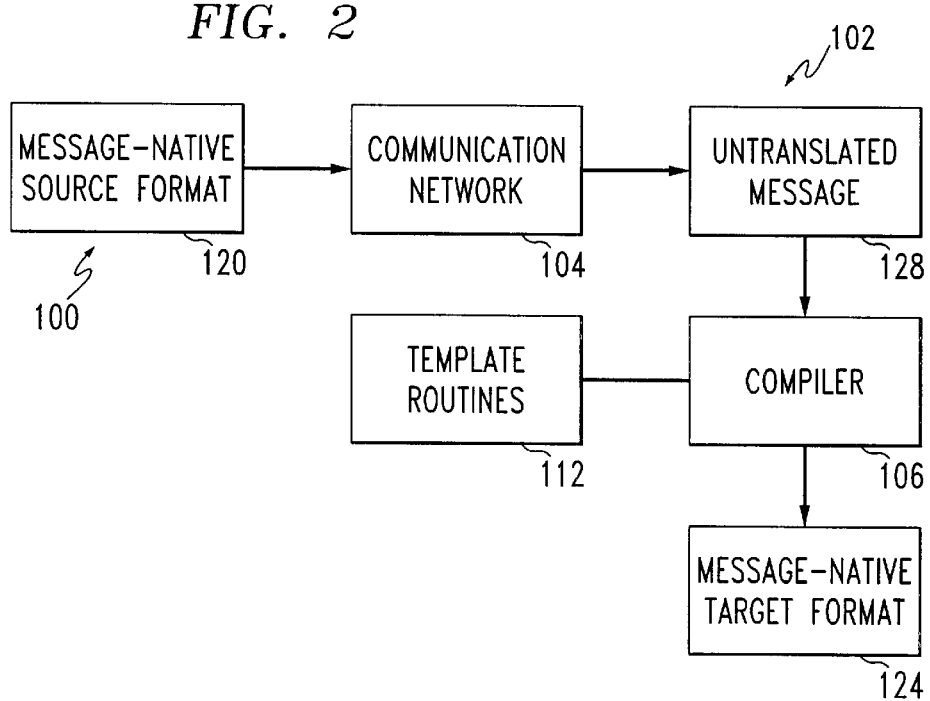
FIG. 2 is a high level system diagram illustrating the system of the invention, with message translation at the target CPU.

Referring to FIGS. 1 and 2, high level system diagrams illustrate the system of the invention including source CPU 100, target CPU 102, and communication network 104. In FIG. 1, a message 120 is a translated into translated message 122 by compiler 106 using template routines 110 at the source CPU 100. In FIG. 2, message 128 is translated into message 124 by compiler 106 using template routines 112 at the target CPU 102. As used herein, a host machine is the system 100 (FIG. 1) or system 102 (FIG. 2) at which compilation and execution of the algorithm of the invention occurs. Source system 100 (FIGS. 1 and 2) is the system communication messages to target system 102 (FIGS. 1 and 2).

Table 1 provides an example implementation of the preferred embodiment of the invention in portable C code source. The syntax of the C code source of Table 1 is described in *The C Programming Language,* by Bryan W. Kernighan and Dennis M. Ritchie, published by Prentise Hall, copyright 1988, 1978 by Bell Telephone Labs. This work is commonly referred to as "K&R C".

The C code of the embodiment of the invention set forth in Table 1 only deals with data conversion at the sending system 100 (FIG. 1). Data conversion is only required at either the sending system 100 (FIG. 1) or the receiving system 102 (FIG. 2), and NOT at both. At line 170 of Table 1 is the comment that this procedure sends a message of type MessageStructure to a companion procedure on another system. Referring to FIG. 1, this refers to an application on the other side 102 of communication link 104 that will use the data in the format 124 in which it is received.

Figure 3:
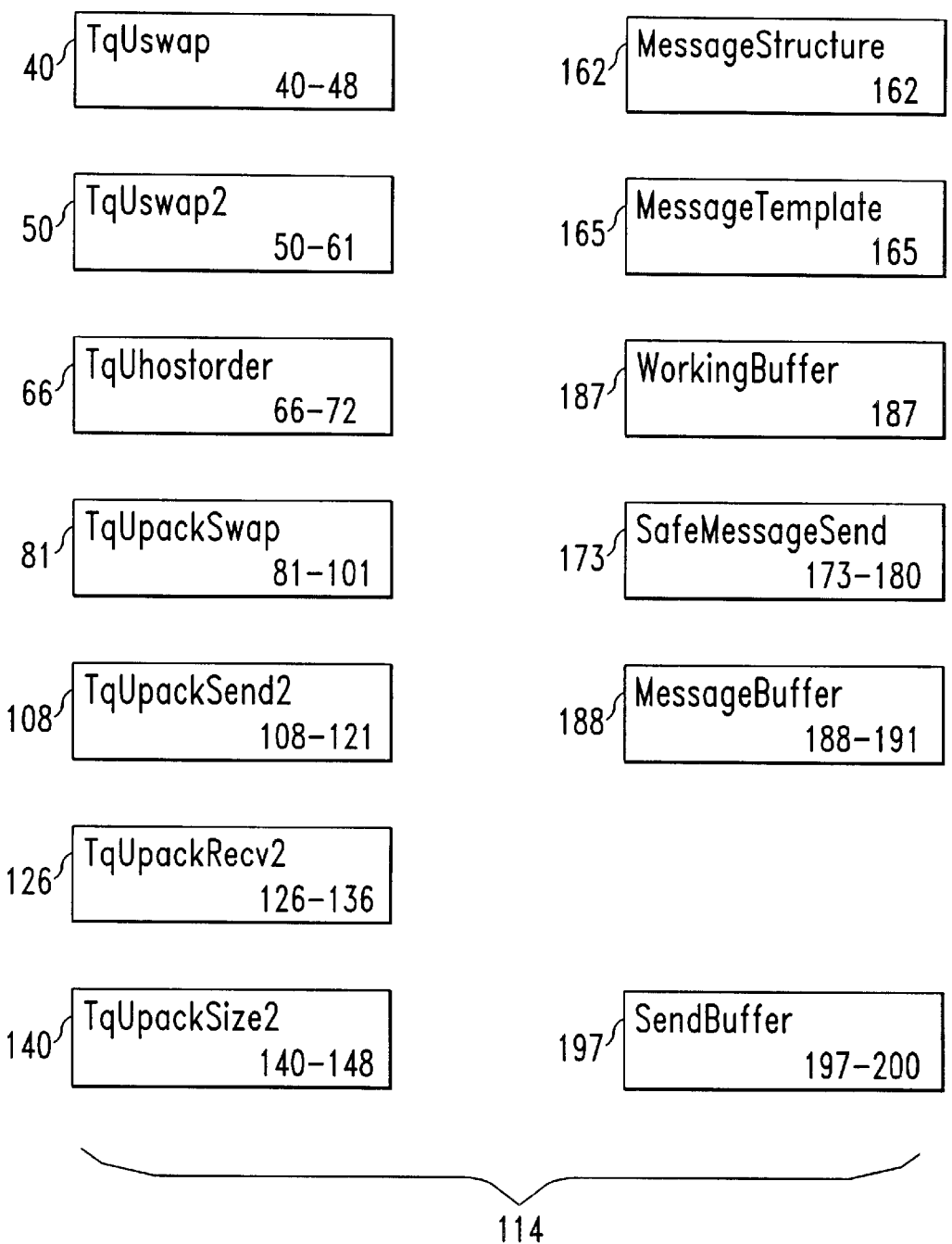
FIG. 3 is a diagram illustrating the template routines of the preferred embodiment of the invention, and their use in a specific embodiment at a source CPU.

Referring to FIG. 3, the routines 114 comprising template routines 110, and several routines utilizing template routines 110 in connection with a specific example, are illustrated. In the case of each routine, the reference number assigned to the programming structure or procedure is the same as the line number at which it begins in the C code source listing of Table 1.

A template is a generic concept for an object used to shape an operation. In this case, it is used to shape a data structure. "Template" does not have a specific definition in the art, but is being used here to mean a structure that will be filled in. Template routines 110 include TqUswap 40 (which exchanges high and low bytes of word values); TqUswap2 50 (which reverses byte order of long values); TqUhostorder 66 (which returns TRUE if and only if the current execution platform byte order is different than the native byte order on the host system); TqUpackSwap 81 (which processes the packed structure 'data' performing byte order adjustments as specified by the associated unpacked 'template' value); TqUpackSend2 108 (which does structure packing followed by byte-order manipulation before a send operation and copies the unpacked buffer 'source' to the packed buffer 'target' according to the 'template' buffer, which is of the specified 'length'); TqUpackRecv2 126 (which does structure unpacking after byte-order manipulation after a receive operation by copying the packed buffer 'source' to the unpacked buffer 'target' according to the 'template' buffer, which is of the specified 'length'); and TqUpackSize2 (which returns the packed buffer size represented by the given template, of the specified length, which is equivalent to the number of non-zero bytes in the template). Various programming structures utilizing these template routines include MessageStructure 162 (which declares a message to be communicated to another system, and is built out of component types from the cross-platform header file at lines 4–34); MessageTemplate 165 (a structure which declares a message template which will be used to determine the packing and byte-reordering behavior of the compiler); SafeMessageSend 173 (a procedure which sends a message of type MessageStructure to a companion procedure on another system, with the values of the various fields within the message preserved precisely regardless of the processor architecture or compiler packing rules of the source system or the target system); MessageBuffer 188 and WorkingBuffer 187 (used by a procedure which allocates storage for a working buffer, does a block copy of the message into the working buffer, and then calls TqUpackSend to do an integrated packing and byte-reordering copy back to the original message buffer); and SendBuffer 197 (a structure which contains the final, adjusted message of a length determined by TqUpackSize( ) ready to be transmitted).

C code beginning with TqUpackSwap 81 implements the concept behind "template" in accordance with the preferred embodiment of the invention. TqUpackSwap 81 processes the packed structure 'data', performing byte order adjustments as specified by the associated unpacked 'template' value. The size of the template is given by 'length', in bytes. Fields in the template are initialized by filling them with their lengths in bytes in *each* byte position in the field. Zero bytes in 'template' are ignored, as they would have been inserted by the compiler during structure alignment. This procedure is automatically disabled on execution platforms, or source CPU 100, which have opposite byte ordering from the host, or target, system 102. Consider, for example, an eight bit quantity getting stuffed into a four byte boundary. vptr template (line 81) is an unspecified pointer—a pointer to a raw hunk of memory. It is built at line 153, which includes CrossPlatform.h. An example of a message structure is defined at line 158 to include three fields: Function, Signature and Pad[3]. Function is one byte (8 bits), Signature is 4 bytes (32 bits), and Pad[3] is 3 bytes, for a total of eight bytes of interest. Because #pragma pack(1) has not been used in this program, there is no guarantee the compiler loaded these eight bytes into 8 bytes of memory—but probably into 12 bytes.

Figure 4:
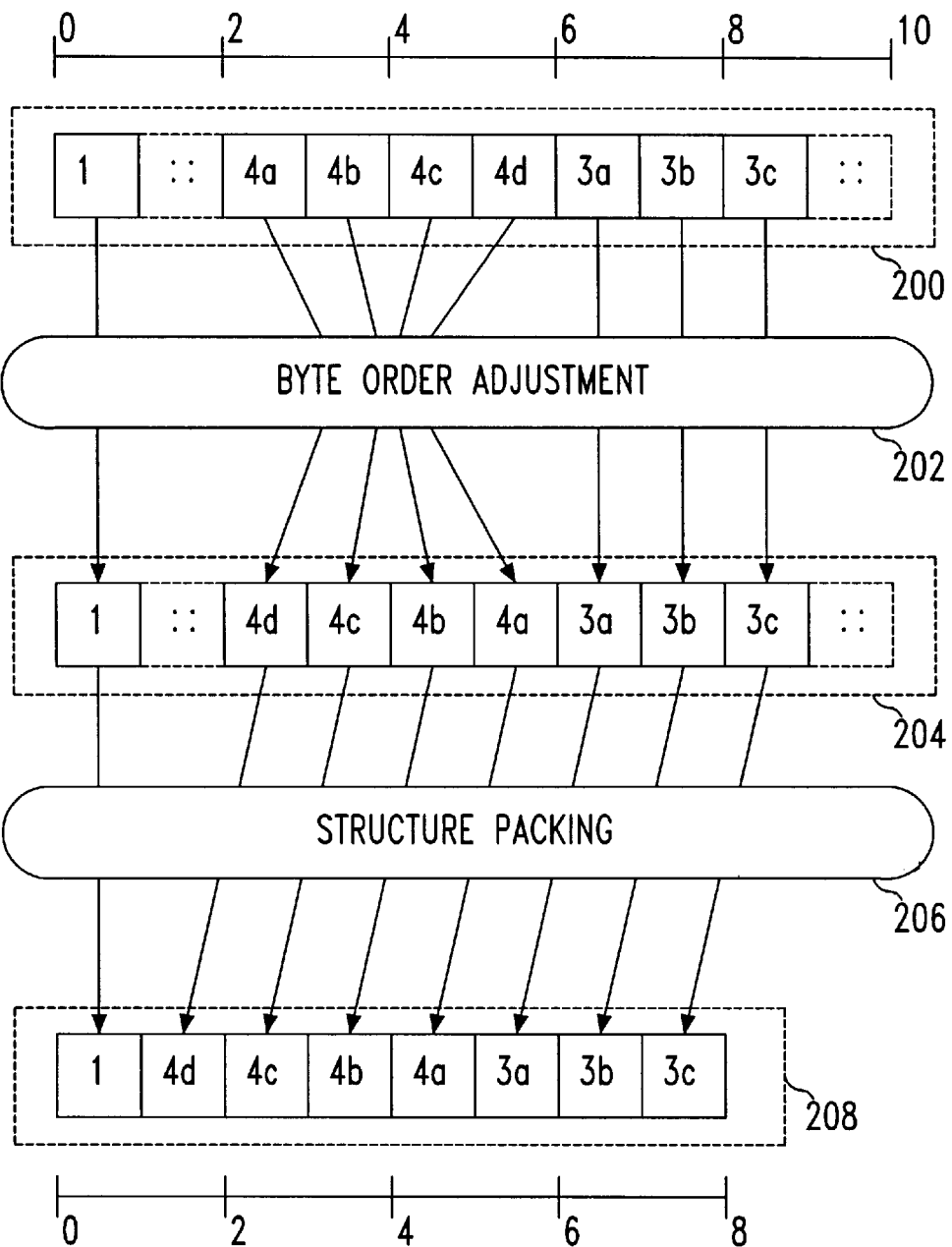
FIG. 4 is a diagram illustrating byte order adjustment and structure packing as implemented in a preferred embodiment of the invention.

Referring FIG. 4 and Table 1, line 165, MessageStructure 165 is the native computer 100 implementation of a message structure. That message structure appears as message 200 in FIG. 4, which illustrates gaps and integer values that are byte reversed. The compiler does not know if such gaps and byte reversals exist, and at this point does not care. Subsequently, byte order adjustment 202 yields the data format 204, and structure packing 206 yields data according to network byte order 208.

Figure 5:
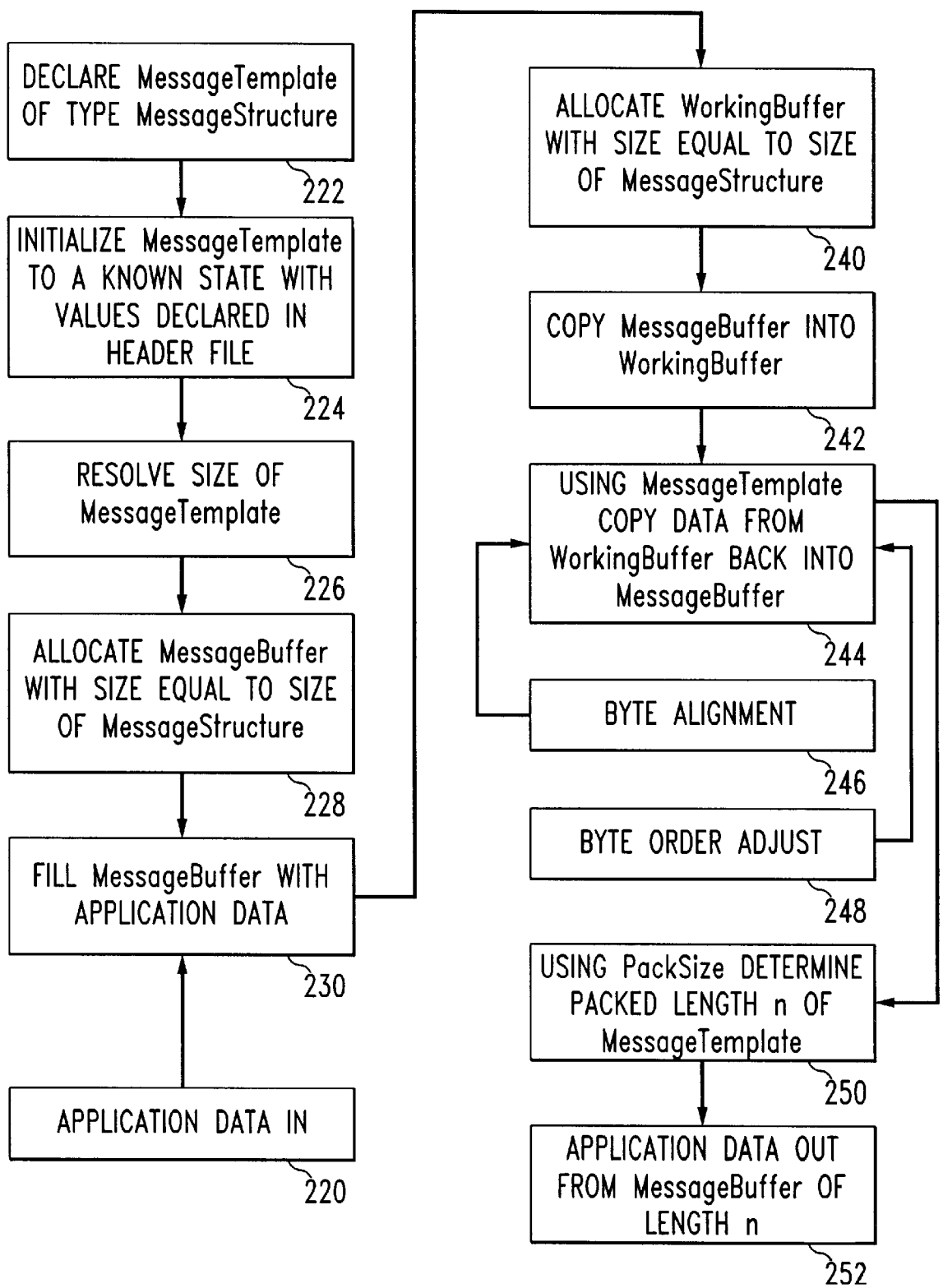
FIG. 5 is a schematic representation of the preferred method of the present invention.

Referring to FIG. 5 in connection with Table 1, in step 222, MessageTemplate 165 is named and declared to be of type MessageStructure 162. ("Static" is the storage class specifier, and tells the compiler where to locate MessageStructure in the source file.) The MessageStructure type is declared at lines 158–162, and its arguments are Function, Signature and Pad[3].

In step 224, MessageTemplate 165 is initialized. The declaration at lines 165 and 166 is read as follows: there is something of type MessageStructure that is to be named MessageTemplate, and in this specific instance of MessageTemplate the three initialization values are BYTE1, BYTE4, and TSTR3. These initialization values have been declared in the header file of Table 1 at lines 17, 19, and 22, respectively, as follows: BYTE1 (corresponding to Function) is a single byte set equal to 0x 01U (where "0x" indicates use of hexidecimal notation); BYTE4 (corresponding to Signature) is equal to 0x04040404U, a four byte value with each byte having a value of 4); TSTR3 (read as T string 3, corresponding to Pad) is three bytes, each byte having the value "1". PAD3 is interpreted as three individual byte values. That is, it is three one byte long quantities. Such arrays of bytes are recognized by the compiler as consecutive in memory, a compiler feature that is essential to proper operation of the preferred embodiment of the invention. Thus, the instance of MessageTemplate 165 at line 165 has been initialized to a known state (that is, to the values of BYTE1, BYTE4 and TSTR3). However, because compiler 106 may have padded the structure, its size is unknown at this point.

In step 226, the size of MessageTemplate 165 will be resolved beginning at line 173.

In step 228, a memory space MessageBuffer 187 is allocated at line 175 (read "malloc" as "memory allocation") which is the size of MessageStructure 162—at least 8 bytes, probably more.

In step 230, at lines 176–180 this dynamically created object MessageBuffer 187 is filled with application data 220 (shown here as a test pattern for purposes of this example.) At this point, the compiler has built two objects: MessageTemplate 165 and MessageBuffer 188.

In step 240, at line 187, WorkingBuffer 187, a temporary place to build a portable data structure to send to another machine, is allocate using same size as MessageStructure 162.

In step 242, at line 188, MessageBuffer 188 is copied (memcpy) into WorkingBuffer 187.

In step 244, at line 189, a call to TqUpackSend takes the MessageTemplate 165 defined on line 165 and use it to copy data from WorkingBuffer 187 to MessageBuffer 188—a copying back using the logic in TqUpackSend2 108 (see lines 33 and 108–121). After this copy back operation, the contents of MessageBuffer 188 may be different than originally; that is, as a result of byte alignment 246 (such as is shown at 206, 208 of FIG. 4) and byte order adjustment 248 (such as is shown at 202, 204 of FIG. 4), data may have been packed, and the byte order may have been reversed. At line 190 the dynamically ordered storage WorkingBuffer 187 is released.

Referring further to FIG. 4, byte alignment 246 is illustrated at structure packing step 206. This is done by taking advantage of the behavior of compilers when representing structures which are not packed; that is, they insert bytes having zero value. That this is true allows the preferred embodiment of the invention to compensate for (that is, translate between) structure packing differences in communication and host environments. Referring to Table 1, lines lines 85–100: if a null byte is encountered in template, it is ignored if it didn't exist. Lines 99–100 advance past the null byte without taking action.

Referring further to FIG. 4, byte order adjustment 248 is illustrated at step 202. This is done in the embodiment of Table 1 at lines 87–89. For a single byte value, there is no adjustment. For multi-byte items, the order of the bytes in the item may need to be reversed. The need for reversal is determined by TqUhostorder 66 at lines 66–72, a routine which returns true or false based on the need to reverse byte order. This need is recognized at line 68. At line 67 a two byte array SwapFlag[2] is created. Inasmuch as byte arrays are implemented by compilers without gaps, the two byte array will have the value 00FF. On line 68 compiler 106 is instructed to interpret the value 00FF (hex) as an unsigned 16 bit integer, and interpret SwapFlag[2] as if it were a pointer to a unsigned integer (the * represents the value of that unsigned integer) and then determine if that value is equal to hex 00FF. Thus, two representations of the number 00FF (hex), or 255 (decimal) are provided: line 68 provides the native representation 0x 00, 0xFF, and line 67 provides a communications representation 0x00FF. If determined to be equal to each other, then TqUhostorder 66 returns TRUE (line 69), indicating that the native order on this platform matches the communications byte order, and byte order adjustment is not required for this multi-byte item.

The result is an adjusted message 208 in MessageTemplate 165 to send to another machine. But, its size is still unknown.

Consequently, in step 250, at line 197, a call is made to TqUpackSize2 140 for MessageTemplate 165. TqUpackSize is the macro described at line 34, and at lines 140–148, TqUpackSize 140 interprets MessageTemplate 165 and returns a value n representing its packed length. The value n represents the number of bytes in MessageBuffer 188 that need to be sent to another machine. At line 140, TqUpackSize 140 works through the template value 200 counting all the non-zero bytes that it encounters. In this example, it will count a total of eight bytes, and return a value of eight, n=8.

In step 252 application data is sent to communication network 104 from MessageBuffer 188 at source CPU 100 of length n (n=8 in the example of FIG. 4).

The example in Table 1 is that of converting at the sending system 100 a message block 120 encoded in the native format of the sending system 100 to that of the format of the receiving system 102. However, receiving a message block 128 is equivalent. That is, a receiving system 102 receiving a message 128 in the native format of the sending system 100 may do the same process to convert the message 128 from the native format 120 of the sending system 100 into a message 124 of the format of the receiving system 102. This conversion need be done only by the sender 100 or the receiver 102, and may be implemented at either end of the communication network 104.

By way of summary, the method of the invention for translating between native data structures 120 on an arbitrary host machine 100 and specific message structures 124 on a communication media 102, 104 comprises the steps of defining templates 222, 224 which represent data structures 124 on the communication media; defining data structures 220, 230 in the host machine that represent the communication structures 124; performing translations between these two representations, the translations including: adjusting for byte alignment 206; and adjusting for byte order 202; whereby the byte order and word alignment 200 on the native machine is translated as needed into the byte order and word alignment 208 required in the communication media. Reference herein to data structures on a communication media refers to data structures of a format recognized at the application level of the target machine, and not to data formats required by the communication link itself.

Advantages Over the Prior Art

In accordance with the invention, an improved system and method for structure packing and byte ordering is provided. Further is provided an improved system and method for writing portable communications software that will work properly in a wide variety of target environments. Further still, there is provided an improved system and method for translating between native data structures on arbitrary machines and specific message structures on communication media, and for translating data structures such that the byte order and word alignment on a native machine is translated as needed into the byte order and word alignment required in a communication media.

TABLE 1

PORTABLE C CODE EMBODIMENT

```
###########################################################################
Header File: Cross-Platform Macro And Library Procedure Declarations
###########################################################################
    // Portable data type declarations.
typedef unsigned char         bit8 ;   // primary  8-bit unsigned type
typedef unsigned short  int   bit16;   // primary 16-bit unsigned type
typedef unsigned long   int   bit32;   // primary 32-bit unsigned type
typedef signed char           int8 ;   // primary 8-bit signed type
typedef singed short    int   int16;   // primary 16-bit signed type
typedef signed long     int   int32;   // primary 32-bit signed type
typdef bit16 uint ;                    // alias
typedef bit32 ulint ;                  // alias
typedef byte * bptr ;                  // byte pointer
typedef void * vptr ;                  // void pointer
    // Macros for populating message structure templates. Each bytes in each
    // value encodes, in an invariant way, the length of the value.
#define BYTE1 0x01U              // template value for int8, bit 8
#define BYTE2 0x0202U            // template value for int16, bit16
#define BYTE4 0x04040404U        // template value for int32, bit32
    // Macros for specifying short fixed-length byte arrays (strings)
#define TSTR2 {1,1}              // template value for byte[2]
#define TSTR3 {1,1,1}            // template value for byte[3]
#define TSTR4 {1,1,1,1}          // template value for byte[4]
#define TSTR5 {1,1,1,1,1}        // template value for byte[5]
#define TSTR6 {1,1,1,1,1,1}      // template value for byte[6]
#define TSTR8 {1,1,1,1,1,1,1,1}  // template value for byte[8]
    // Library procedure declarations.
extern void TqUpackRecv2( vptr template, uint length, vptr target, vptr source);
extern void TqUpackSend2( vptr template, uint length, vptr target, vptr source);
extern uint TqUpackSize2( vptr template, uint length);
    // Helper macros to make using library procedures more simple.
#define TqUpackRec(x,y,z) TqUpackRecv2( &x, sizeof(x), y, z)
#define TqUpackSend(x,y,z) TqUpackSend2( &x, sizoeof(x), y, z)
#define TqUpackSize(x    ) TqUpackSize2( &x, sizeof(x)    )
###########################################################################
Library File: Cross-Platform Library Procedure Implementation.
###########################################################################
// *** BEGIN PRIVATE PROCEDURE IMPLEMENTATIONS ********************************
// Exchange high and low bytes of word values.
static uint TqUswap ( uint value) {
    byte temp, temp1[2];
    TqUmemcpy( temp1, &value, 2);
    temp = temp1[1];
    temp1[1] = temp1[0];
    temp1[0] = temp;
    TqUmemcpy( &value, temp1, 2);
    return value;
}
// Reverse byte order of long values.
static ulint TqUswap2( ulint value) {
    byte temp1, temp2, templon[4];
    TqUmemcpy( templon, &value, 4);
    temp1 = templon[0];
    temp2 = templon[1]
    templon[0] = templon[3];
    templon[1] = templon[2];
    templon[2] - temp2;
    templon[3] = temp1;
    TqUmemcpy( &value, templon, 4);
    return value;
}
// Return TRUE if and only if the current execution platform byte order is
// different than the native byte order on host systems. This will be the case
// for Macintosh and AIX on the RS/6000 or PowerPC systems. This will not be
// the case for DOS, Windows and OS/2 on Intel CPU's.
Static byte TqUhostorder( void) {
    static byte SwapFlag[2] = { 0x00, 0xFF };
    if (* (uint *) SwapFlag == 0x00FF) {
      return TRUE;
    } else {
```

TABLE 1-continued

PORTABLE C CODE EMBODIMENT

```
            return FALSE;
    }   }
// Process the packed structure 'data' performing byte order adjustments as
// specified by the associated unpacked 'template' value. The size of the
// template is given by 'length', in bytes. Fields in the template are
// initialized by filling them with their lengths in bytes in *each* byte
// position in the field. Zero bytes in 'template' are ignored (they were
// inserted by the compiler during structure alignment). This procedure is
// automatically disabled on execution platforms which have opposite byte
// ordering from host systems.
Static void TqUpackSwap( vptr template, uint length, vptr data) {
        if (!TqUhostorder( )) {
            bptr t = (bptr) template, d = (bptr) data;
            while (length) {
              if (t[0]) {
                switch (t[0]) {
                    case 1:                                             break
                    case 2: * (uint *) d = TqUswap( * (uint *) d);      break;
                    case 4: * (uling *) d = TqUswap2*( * (uling *) d);  break;
                    default: TqTabend( "TqUpackSwap", t[0]);
                }
                if (length < t[0]) {
                    TqTabend( "TqUpackSwap", t[0]);
                }
                length -= t[0];
                d += t[0];
                t += t[0];
              } else {
                length -= 1;
                t += 1;
} } } }
// *** END PRIVATE PROCEDURE IMPLEMENTATIONS
//**************************************
// *** BEGIN PUBLIC PROCEDURE IMPLEMENTATIONS
//**************************************
// Do structure packing followed by byte-order manipulation before a
// send operation.
// Copy the unpacked buffer 'source' to the packed buffer 'target' according
// to the 'template' buffer, which is of the specified 'length'.
void TqUpackSend2( vptr template, uint length, vptr target, vptr source) {
        bptr x = template;
        bptr t = source;
        bptr t = target;
        uptr t = target;
        uint n = length;
        while (n--) {
            if (*x++) {
                *t++ = *s;
            }
            s++;
        }
        TqUpackSwap( template, length, target);
}
// Do structure unpacking after byte-order manipulation after a receive
// operation.
// Copy the packed buffer 'source' to the unpacked buffer 'target' according
// to the 'template' buffer, which is of the specified 'length'.
void TqUpackRecv2( vptr template, uint length, vptr target, vptr source) {
        bptr x = template;
        bptr s = source;
        bptr t = target;
        TqUpackSwap( template, length, source);
        while (length--) {
            if (*x++) {
                *t = *s++;
            }
            t++;
    }   }
Return the packed buffer size represented by the given template, of the
// specified length. This is equivalent to the number of nonzero bytes in
// the template.
uint TqUpackSize2( vptr template, uint length) {
        bptr x = template;
        uint n = 0;
        while (length--) {
            if (*x++) {
                n++;
```

TABLE 1-continued

PORTABLE C CODE EMBODIMENT

```
    } }
    return n;
}
// *** END PUBLIC PROCEDURE IMPLEMENTATIONS *************************************
################################################################################
Sample Application Code Using The Cross-Platform Library
################################################################################
// Pull in the library procedure and helper macro declarations.
    #include "CrossPlatform.h"
// The following structure declaration defines a message which we wish
// to communicate to another system. The message is built out of
// component types from the cross-platform header file.
    typedef struct {
       bit8   Function    ; // message identifying flag character
       bit32  Signature   ; // test value to ensure encryption working
       byte   Pad[3]      ; // make a response block 8 bytes long
    } MessageStructure; // packed size = 8, actual size = 8+
// The following structure declares a message template which will be used
// to determine the packing and byte-recording behavior of the compiler.
    static MessageStructure MessageTemplate = {
       BYTE1, BYTE4, TSTR3
    };
// This procedure sends a message of type MessageStructure to a companion
// procedure on another system. Within the message, the values of the
// various fields will be preserved precisely regardless of the processor
// architecture or compiler packing rules of the source system or the
// target system.
Void SafeMessageSend ( void) {
    // Allocate storage for a message.
       MessageStructure * MessageBuffer = malloc( sizeof( MessageStructure));
    // Fill in the fields of the message using standard assignment and
    // block copy operations.
       MessageBuffer—>Function   = 0x01;
       MessageBuffer—>Signature  = 0x23456789;
       memcpy( MessageBuffer—>Pad, "ABC", 3);
// Allocate storage for a working buffer, do a block copy of the
// message into the working buffer (which is guaranteed to be
// large enough because it is allocated identically to the message),
// then use the TqUpackSend procedure to do an integrated
// packing and byte-reordering copy back to the original message
// buffer. After doing this, the work buffer may be freed.
    { MessageStructure * WorkingBuffer = malloc( sizeof ( MessageStructure));
       memcpy( WorkingBuffer, MessageBuffer, sizeof( MessageStructure));
       TqUpackSend( MessageTemplate, MessageBuffer, WorkingBuffer);
       free( WorkingBuffer);
    }
// The final, adjusted, message is now ready to be transmitted. In this
// example the existence of a generic binary 'SendBuffer' procedure is
// assumed. TqUpackSize ( ) is needed to give the actual number of bytes
// of packed data in the adjusted message (it may be smaller than the
// native size of a MessageStructure).
    SendBuffer ( MessageBuffer, TqUpackSize( MessageTemplate));
    // The message is now sent. Depending on the symantics of SendBuffer,
    // the message buffer may or may not need to be explicitly freed.
}
################################################################################
END
################################################################################
```

Alternative Embodiments

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

I claim:

1. A system compiler template structures for enabling byte order and word alignment on a native machine to be translated as needed into the byte order and word alignment required in a communication media, comprising:

an unpacked source buffer;

a packed target buffer;

a template buffer;

a first swap structure for exchanging high and low bytes of word values;

a second swap structure for reversing byte order of long values;

a host order structure for returning a value TRUE if and only if the byte order of said communication media is different than the byte order on said native system;

a pack swap structure for processing a packed structure 'data' by performing byte order adjustments as specified by an associated unpacked 'template' value;

a pack send structure for structure packing followed by byte-order manipulation before a send operation and for copying said unpacked source buffer to said packed target buffer according to said template buffer, which is of a specified length;

a pack receive buffer for unpacking after byte-order manipulation after a receive operation by copying said packed source buffer to said unpacked target buffer according to said template buffer, which is of a specified length; and a pack size structure for return the packed buffer size represented by the given template, of the specified length, which is equivalent to the number of non-zero bytes in the template.

2. A method for translating application data on a native machine into the byte order and word alignment required in a communication media, comprising the steps of:

initializing a data structure MessageTemplate of type MessageStructure to a known state;

resolving a size of said MessageTemplate;

allocating a data structure MessageBuffer with a size equal to MessageStructure;

filling said MessageBuffer with said application data;

allocating a data structure WorkingBuffer with a size equal to the size of said MessageStructure;

copying the contents of said MessageBuffer into said WorkingBuffer;

selectively byte aligning and byte order adjusting the contents of said WorkingBuffer and copying the resulting packed data back to said MessageBuffer;

determining the length n of packed data in said MessageTemplate; and sending packed data of length n from said MessageBuffer to said communication media.

* * * * *